(12) United States Patent
Beckman et al.

(10) Patent No.: US 11,823,647 B2
(45) Date of Patent: Nov. 21, 2023

(54) RESPONSIVE LAYOUT SYSTEM AND SERVER

(71) Applicant: AVEVA SOFTWARE, LLC, Lake Forest, CA (US)

(72) Inventors: Allan Scott Beckman, Lake Forest, CA (US); Manoranjan Kumar Singh, Lake Forest, CA (US); Chungho Chau, Lake Forest, CA (US); Raghuveer Addagatla, Lake Forest, CA (US); Steven Michael Weinrich, Lake Forest, CA (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 0 days.

(21) Appl. No.: 17/688,256

(22) Filed: Mar. 7, 2022

(65) Prior Publication Data

US 2023/0018841 A1 Jan. 19, 2023

Related U.S. Application Data

(63) Continuation of application No. 16/999,889, filed on Aug. 21, 2020, now abandoned.

(Continued)

(51) Int. Cl.
*G09G 5/373* (2006.01)
*G09G 5/14* (2006.01)
(Continued)

(52) U.S. Cl.
CPC ......... *G09G 5/373* (2013.01); *G06F 3/04845* (2013.01); *G06F 3/04847* (2013.01);
(Continued)

(58) Field of Classification Search
CPC ...... G09G 5/373; G09G 5/14; G06F 3/04845; G06F 3/04847
See application file for complete search history.

(56) References Cited

U.S. PATENT DOCUMENTS

| 10,235,641 B2 | 3/2019 | Godber |
| 2013/0305145 A1 | 11/2013 | Jackson et al. |

(Continued)

FOREIGN PATENT DOCUMENTS

| KR | 10-1509392 B1 | 4/2015 |
| KR | 10-2017-0083718 A | 7/2017 |

(Continued)

OTHER PUBLICATIONS

Korean Intellectual Property Office, International Search Report and Written Opinion for International Application No. PCT/US2020/047465, dated Nov. 25, 2020, 12 pages.

*Primary Examiner* — Seth A Silverman
(74) *Attorney, Agent, or Firm* — Greenberg Traurig, LLP

(57) ABSTRACT

The disclosure is directed to a novel responsive layout that allows the user to build one layout that can fit on all or virtually all device form factors according to some embodiments. In some embodiments, the responsive layout is configured to allow users to arrange their content based on the size and shape of a display. In some embodiments, the system is configured to receive a request to access content through a computer and in response to the request, automatically generate a responsive layout based on a display size and a content of the request. In some embodiments, the responsive layout includes a responsive layout editor pane configured to allow the user to customize the responsive layout as desired.

18 Claims, 12 Drawing Sheets

Related U.S. Application Data

(60) Provisional application No. 62/890,011, filed on Aug. 21, 2019.

(51) Int. Cl.
    *G06F 3/04845*     (2022.01)
    *G06F 3/04847*     (2022.01)

(52) U.S. Cl.
    CPC ......... *G09G 5/14* (2013.01); *G09G 2340/045* (2013.01); *G09G 2354/00* (2013.01)

(56) References Cited

U.S. PATENT DOCUMENTS

| | | | |
|---|---|---|---|
| 2014/0258849 A1* | 9/2014 | Chung | G06F 40/106 715/243 |
| 2014/0337767 A1 | 11/2014 | Hsu et al. | |
| 2015/0074516 A1 | 3/2015 | Ben-Aharon et al. | |
| 2015/0135104 A1* | 5/2015 | Osterhoff | G06F 8/20 715/765 |
| 2017/0032050 A1* | 2/2017 | Kol | G06F 8/36 |
| 2017/0322704 A1 | 11/2017 | Gentilcore et al. | |
| 2018/0032626 A1* | 2/2018 | Ben-Aharon | G06F 40/103 |
| 2019/0087392 A1* | 3/2019 | Ben-Aharon | G06F 40/106 |
| 2019/0250790 A1 | 8/2019 | Bostick et al. | |

FOREIGN PATENT DOCUMENTS

| | | |
|---|---|---|
| KR | 10-1771473 B1 | 8/2017 |
| KR | 10-2019-0001894 A | 1/2019 |

* cited by examiner

RESPONSIVE LAYOUT SYSTEM AND SERVER

CROSS-REFERENCE TO RELATED APPLICATIONS

This application is a continuation of U.S. patent application Ser. No. 16/999,889, filed Aug. 21, 2020, entitled "Responsive Layout System and Server", which claims the benefit of and priority to U.S. Provisional Application No. 62/890,011, filed Aug. 21, 2019, entitled "Responsive Layout System and Server", the entire contents of which are incorporated herein by reference.

BACKGROUND

The current layout system requires users to create and maintain different layouts on each device. While fixed layouts may work reasonably well when the display size is known, responsive layouts can work well on a much wider spectrum of layout sizes, as they allow content to be displayed and viewed on many different devices.

Accordingly, there is a need to provide a seamless in-the-field responsive layout which allows the user to build one layout that can fit on all or virtually all device form factors.

SUMMARY

Some embodiments of present disclosure provide various exemplary technically improved computer-implemented platforms, systems and methods, including methods for providing a seamless in-the-field responsive layout which allow the user to build one layout that can fit on all or virtually all device form factors (i.e., the size, shape, and/or physical arrangement of a computer and/or display). In some embodiments, the system is configured to receive a request to access content through a computer. In response to receiving the request, in some embodiments, the system is configured to generate a responsive layout based on the size of a display coupled to the computer. In some embodiments, the responsive layout includes a responsive layout editor pane. In some embodiments, the responsive layout editor pane is configured to enable a user to create a custom responsive layout. In some embodiments, the custom responsive layout enables the use to modify the location, size, orientation and/or content of one or more panes.

In some embodiments, the system is configured to display the content based on the responsive layout through on the display. In some embodiments, the system includes a graphical user interface (GUI). In some embodiments, the GUI is configured to receive one or more inputs to select a modified responsive layout through the responsive layout editor pane. In some embodiments, the system is configured to replace the responsive layout by the selected modified responsive layout based on the one or more inputs. In some embodiments, the system is configured to display the content based on the selected modified responsive layout. In some embodiments, the responsive layout editor pane includes one or more sections, the one or more sections including one or more of a responsive grid section, a resolution section, a device breakpoints section, a rotating section, a show-hidden panes section, a property grid section, an adding pane section, and a combination thereof. In some embodiments, the responsive grid section includes one or more panes in the responsive layout. In some embodiments, the layout is configured to be divided into a number of columns based on the one or more inputs. In some embodiments, the device breakpoints section includes one or more breakpoints for the responsive layout. As used herein, "breakpoints" refer to the boundaries for each pane. In some embodiments, the rotation section includes a landscape mode and a portrait mode.

In some embodiments, the system includes a responsive layout system configured to be in electronic communication with a plurality of users, the responsive layout system comprising one or more computers comprising one or more non-transitory computer-readable media storing processor executable instructions, and one or more processors configured to execute the instructions. In some embodiments, the system is configured to receive a request to access content. In some embodiments, in response to the request, the system is configured to generate a responsive layout based on the size of a display.

In some embodiments, the system is configured to fill the available display size with supplemental panes that include information other than what was specified in the request. In some embodiments, the supplemental panes (as well as all panes) comprise one or more of data, charts, graphs, animations, diagrams, maps, text, alerts, color coding, and or any other information retrieved from a database (e.g., a historian database). For example, a request may be a user request for information about the amperage for a pump. In response, the system is configured to show a pane with the requested information according to some embodiments. In some embodiments, the system is configured to automatically display additional information about one or more priorities in one or more supplemental panes. In some embodiments, the system is configured to determine what is a priority. In some embodiments, the system includes artificial intelligence and/or machine learning (collectively referred to as AI) to identify priorities to display in the supplemental panes. In some embodiments, the priorities include: alerts, expected component lifetime, production and/or business trends, predictions, throughput, and/or any information the system has identified as needing corrective action and/or attention. However, in some embodiments, the system is configured to automatically display additional information about items related to request (i.e., the pump) in one or more supplemental panes. In some embodiments, the system is configured to automatically display additional information about items not related to request (e.g., drum rotation speed, statistical analysis for throughput, process flow overview, etc.)

In some embodiments, the responsive layout includes a responsive layout editor pane. In some embodiments, the system is configured to display the content and/or arrange panes based on the responsive layout. In some embodiments, the system is configured to receive an input to modify the responsive layout into a custom layout (i.e., modified responsive layout) through the responsive layout editor pane. In some embodiments, the system is configured to replace the responsive layout by the selected modified responsive layout based on the input. In some embodiments, the system is configured to display the content based on the selected modified responsive layout on the display.

In some embodiments, the responsive layout editor pane includes one or more pane sections, the one or more pane sections including one or more of a responsive grid section, a resolution section, a device breakpoints section, a rotating section, a show-hidden panes section, a property grid section, an adding pane section, and/or a combination thereof. In some embodiments, one or more pane sections are configured to allow a user to customize the attributes of one or more panes. In some embodiments, the responsive grid section includes one or more panes in the responsive layout, where the system is configured to allow a user to modify the attributes of one or more panes in the responsive layout. In some embodiments, the responsive layout is configured to enable a user to organize the panes into a desired number of columns and/or rows based on the input. In some embodiments, the device breakpoints section includes one or more breakpoints for the responsive layout. In some embodiments, the device breakpoints section includes one or more commands that allows users to customize one or more breakpoint attributes. In some embodiments, one or more breakpoint attributes include: the size of the pane, the size of one or more items in the pane, an overflow behavior, and/or any other feature that defines a size of the pane's content and/or the dimensions of the panes. In some embodiments, overflow behavior includes what information is removed from the pane when a user zooms in on a portion of the pane or selects a portion of the pane. For example, a user may zoom in on a graph and the pane may show all items in the pane getting larger until they disappear outside the boundaries of the pane (i.e., similar to a conventional zoom into an area of a static picture). In some embodiments, the rotation section includes a landscape mode and/or a portrait mode and is configured to rotate one or more panes and/or the entire responsive layout based on the rotation section selected mode.

DETAILED DESCRIPTION

Figure 1:
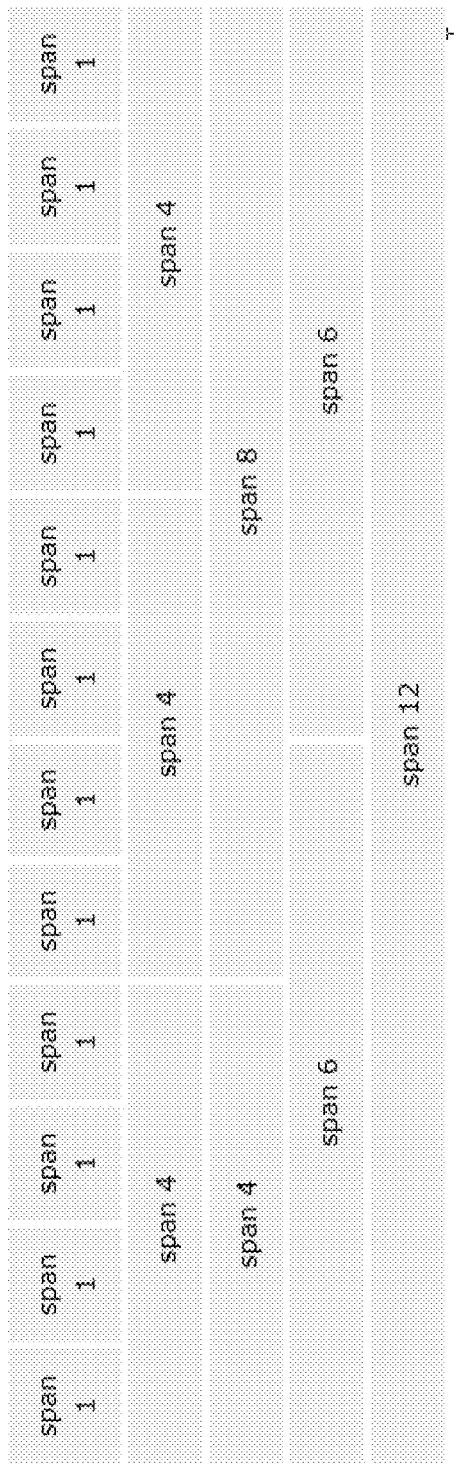
FIG. 1 illustrates a user's display according to some embodiments.

Before any embodiments of the invention are explained in detail, it is to be understood that the invention is not limited in its application to the details of construction and the arrangement of components set forth in the following description or illustrated in the following drawings. Some embodiments of the system are configured to be combined with some other embodiments and all embodiments are capable of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use the system. Various modifications to the illustrated embodiments will be readily apparent to those skilled in the art, and the generic principles recited according to some illustrated embodiments are configured to be applied to and/or combined with some other illustrated embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some embodiments include a 3-dimensional (3D) model, equipment data specifications, maintenance records, related events, drawings and piping and instrumentation diagrams (P&IDs) integrated into a supervisory control and data acquisition (hereinafter "SCADA") operator interface (i.e., a human machine interface (HMI) that presents information to an operator or user about the state of a process, and enables the operator's control instructions).

Some embodiments include an engineering information management system (Application NET) that is configured to be integrated into an operator interface such as InTouch operations management interface (OMI) that automatically presents content-based asset information to operators (also known as users), including a presentation of a 3D representation of where assets/equipment exists in context to other equipment, specific data specifications of the equipment, and/or the traditional SCADA real-time visualizations of operational data. In some embodiments, as the user/operator navigates either the operational model (within the SCADA system) or the engineering model (within Application NET), the display is configured to adjust automatically to the changing context to show the user appropriate contextual information. In some embodiments, the navigation includes zooming in to make the contents of one or more or more panes larger. In some embodiments, the system is configured to zoom in and/or out on a particular pane while other panes are expanded in and/or out of the display while maintaining the same layout.

In some embodiments, responsive layouts are configured to allow the user to build one layout that can fit on all device form factors. In some embodiments, the responsive layout is supported in both desktop and web product offerings. In some embodiments, responsive layouts are configured to be built with a responsive layout editor. In some embodiments, responsive layouts are configured to be used in different product offerings. In some embodiments, current responsive layouts are configured to be supported in InTouch OMI and InTouch Web Client. In some embodiments, the system is configured to use a grid system that includes a series of rows and columns of panes to achieve the responsive layout. In some embodiments, the system is configured to be used in conjunction with a conventional grid system (e.g., Windows Presentation Foundation (WPF) grid system).

In some embodiments, responsive layout panes are configured to support one or more of the following properties: Column Span, Push, Pull, Offset, and/or IsVisible. In some embodiments, the properties are configured to determine how the content will be shown at runtime.

In some embodiments, the single layout is configured to run both in the on-premises Windows-based product and on the web. Some embodiments include, single editor for all device form factors, same editor for on-premises, and the web. In some embodiments, content in responsive layout is configured to be resized, moved, or hidden based on device form factors or other desired properties.

In some embodiments, the responsive layout including the editor and runtimes is configured to be based on or offer similar functionality to the Bootstrap grid system. Some embodiments are configured to use a series of containers, rows, and columns to layout and align content.

In some embodiments, the responsive layout editor is configured to allow a user to create a layout which is configured to respond and change based on the device on which the user is viewing the layout. In some embodiments, the system is configured to enable users to place content on these layouts. In some embodiments, responsive layouts are configured to be used with OMI View Applications.

In some embodiments, responsive layouts are configured to allow users to arrange their content based on the device a user is viewing the layout from. In some embodiments, this includes resizing, moving, and hiding content in the responsive layout. In some embodiments, each responsive layout is configured to have panes and each pane is configured to have content associated with it. In some embodiments, a user can configure how much of the available display an individual pane can occupy on different device form factors. In some embodiments, responsive layouts are configured to provide the same or similar functionality as a conventional Bootstrap Grid System. In some embodiments, the responsive layout is configured to be built using the responsive layout editor.

In some embodiments, the system includes an editor (e.g., a responsive layout editor) is configured to have a selector located on the display (e.g., at the top). In some embodiments, the selector is configured to allow the user to switch between different pre-defined standard device form factors. In some embodiments, this shows the user, in real-time, what a preview of their content will be arranged like on that device. In some embodiments, the selector is configured to change the display view to a different pre-defined standard device form factor.

In some embodiments, the system is configured to display content on different devices such as phones, tablets and laptops. In some embodiments, each of these devices have a different display size which requires a custom layout to be created and maintained. In some embodiments, responsive layouts are configured to automatically arrange and size panes to fit all device displays. In some embodiments, this reduces costs because a user can select a single layout that is automatically adjusted based on the device the content is accessed from. In some embodiments, responsive layouts are configured to allow users to have a single editing experience for how their content will be arranged on all their devices. In some embodiments, the responsive layout editor is configured to allow a user to preview how their content will appear to a user on different device form factors. In some embodiment, this feature greatly improves user productivity.

FIG. 1 illustrates a user's display according to some embodiments. In some embodiments, the grid system is configured to split a user's display into multiple columns across the page (e.g., 2 to 12). In some embodiments, the user groups the columns individually. In some embodiments, the user groups the columns together to create wider columns.

In some embodiments, the grid's system is configured to be responsive. In some embodiments, the columns are configured to rearrange depending on the screen size. In some embodiments, the columns are configured to be on a big screen (e.g., >30" screen). In some embodiments, the columns are configured to look better with the content organized in three columns. In some embodiments, the columns are configured to be on a small screen (e.g., <30" screen). In some embodiments, the columns on a small screen are configured to look better if the content items are stacked on top of each other.

In some embodiments, the grid system is configured to have breakpoints. In some embodiments, the grid system breakpoints consist one or more of: "XS" (extra-small; e.g., about <10% of screen area), "SM" (small; e.g., between about 10.1% and 20% of screen area), "MD" (medium; e.g., e.g., between about 20.1% and 30% of screen area), "LG" (large; e.g., between about 30.1% and 50% of screen area), "XL" (extra-large; e.g., greater than about 50%). The term "about" as used in conjunction with breakpoints is ±0.1%). In some embodiments, these breakpoints are configured to be based on a number of pixels in the display (e.g., total, width, length, diameter and/or a combination thereof). For example: $XS \leq 576$ $px \leq SM \leq 768$ $px \leq MD \leq 992$ $px \leq LG \leq 1200$ $px \leq XL$.

Figure 2:
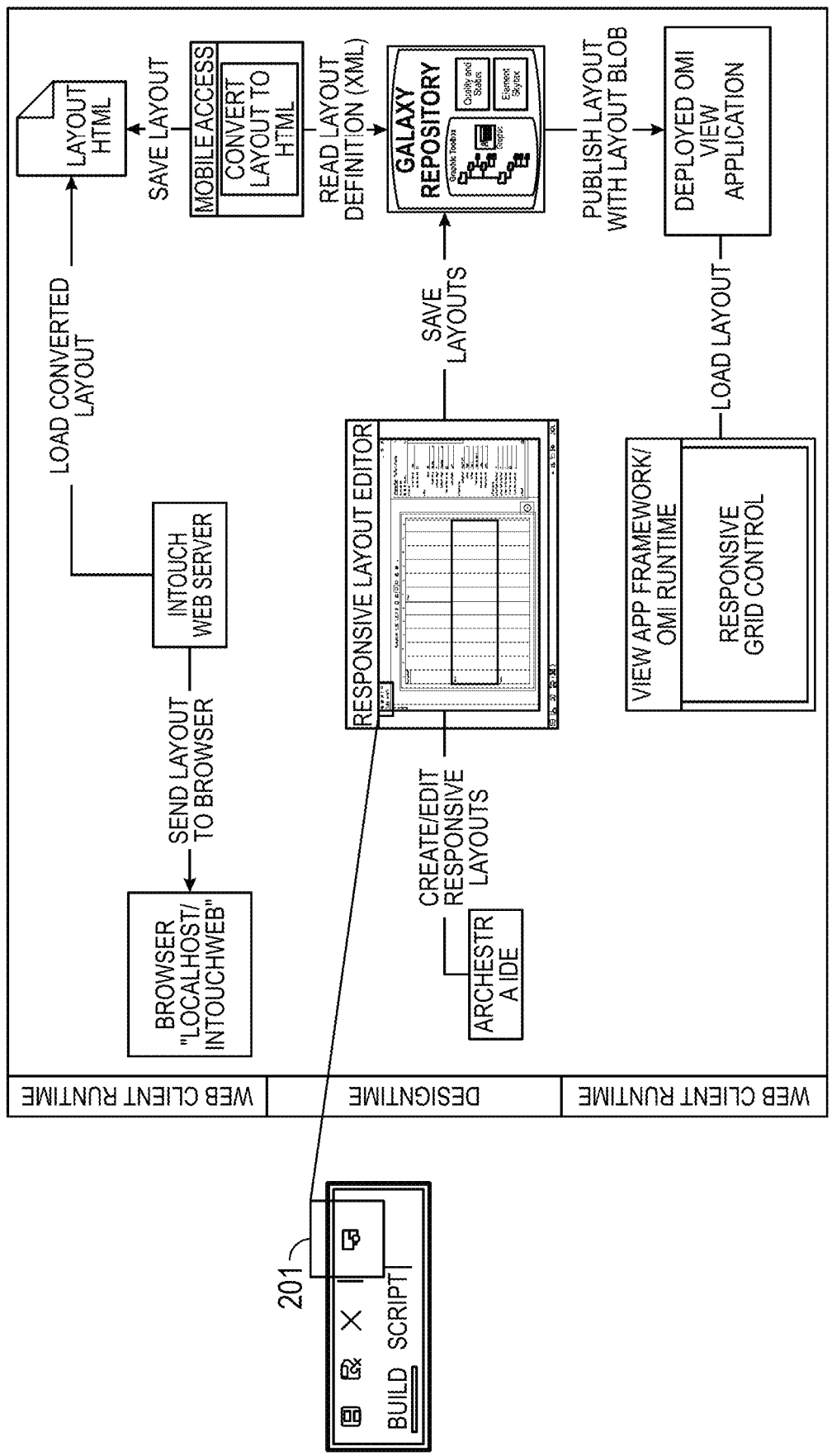
FIG. 2 illustrates a high-level architecture diagram according to some embodiments.

FIG. 2 illustrates a responsive layout editor overview according to some embodiments. In some embodiments, a responsive layout is configured to be an option within the layout editor. In some embodiments, a user makes a layout responsive with options. In some embodiments, options include one or more of 1) IsResponsive property in the Layout Properties; and 2) when set to true (checked), the responsive layout editor appears. In some embodiments, the toolbar button (FIG. 2: 201) is configured to be in the layout editor. In some embodiments, the toolbar button is configured to be used to toggle between responsive and fixed layouts.

Figure 3:
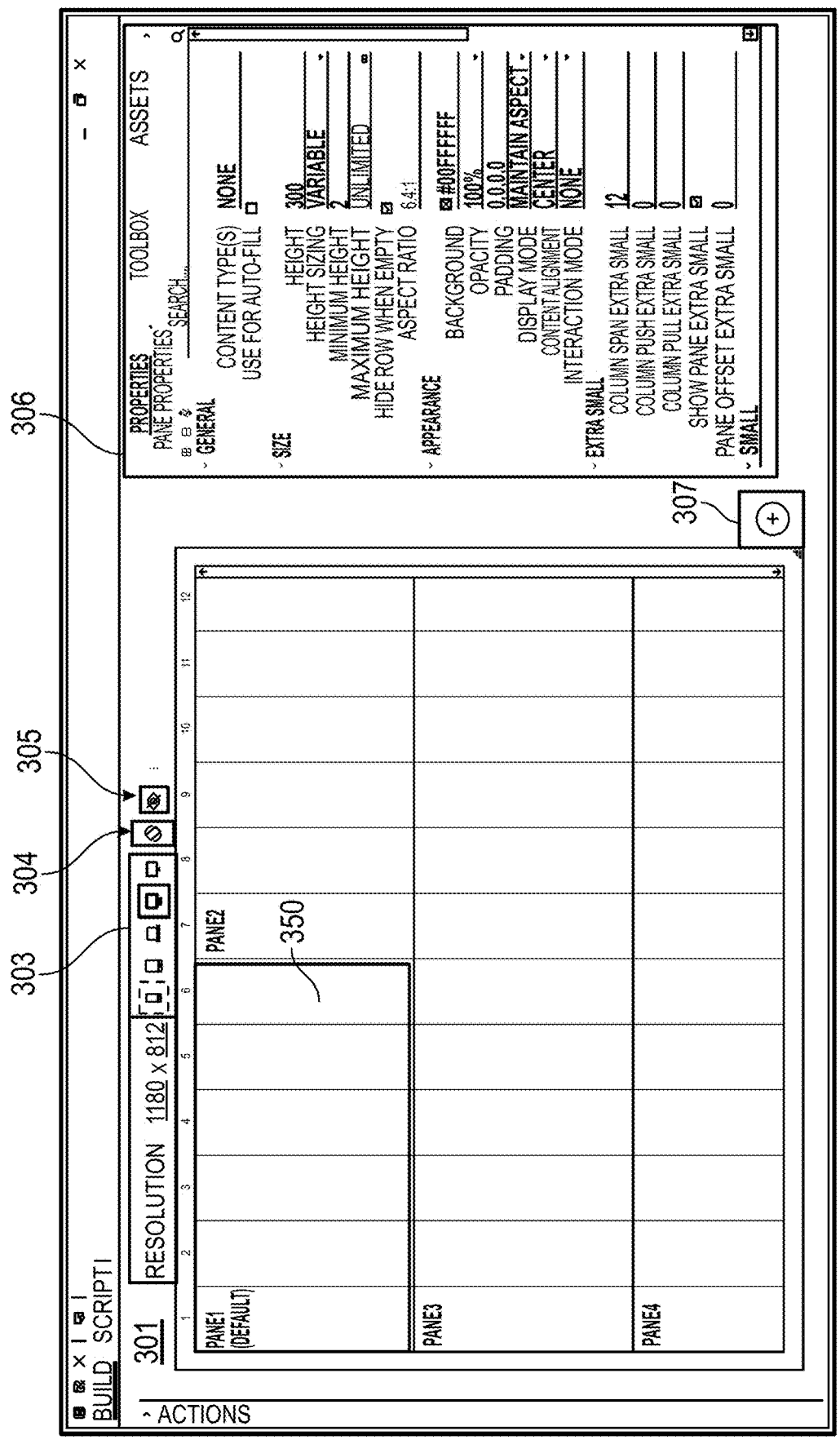
FIG. 3 illustrates a responsive layout editor according to some embodiments.

FIG. 3 illustrates a responsive layout editor according to some embodiments. In some embodiments, the responsive layout editor pane is configured to contain sections. In some embodiments, the sections include one or more of: Section 301: Responsive Grid, Section 302: Resolution, Section 303: Device Breakpoints, Section 304: Rotate, Section 305: Show Hidden Panes; Section 306: Property Grid, Section 307: Add Pane.

In some embodiments, section 301 is configured to contain panes (e.g., Pane 1 (default) 350, Pane 2, Pane 3, etc.) that are in the responsive layout. In some embodiments, numbers 1 through 12 is found along the top. In some embodiments, the layout is configured to be divided into 1 to 12 columns. In some embodiments, the responsive grid is resized by height and width. In some embodiments, section 302 contains current width and height of the responsive grid of section 1. In some embodiments, users enter values in the edit box and the responsive grid will respond.

In some embodiment, section 303 contains buttons which represent different breakpoints (XS, SM, MD, LG, XL) available for the responsive grid. In some embodiments, when a breakpoint is selected, the responsive grid is configured to resize to match the size of the device. In some embodiments, section 304 contains a button that is configured to allow a user to rotate between the landscape mode and the portrait mode. In some embodiments, the width and height are reversed.

In some embodiments, section 305 contains a button that is configured to allow a user to hide or show any panes which have been made hidden through the IsVisible property.

In some embodiments, section 306 contains all properties related to Layout, Panes, and Content. In some embodiments, section 307 contains a button that is configured to be used to add a new pane to the layout. In some embodiments, panes are configured to be added to the end of the list of layouts.

Figure 4:
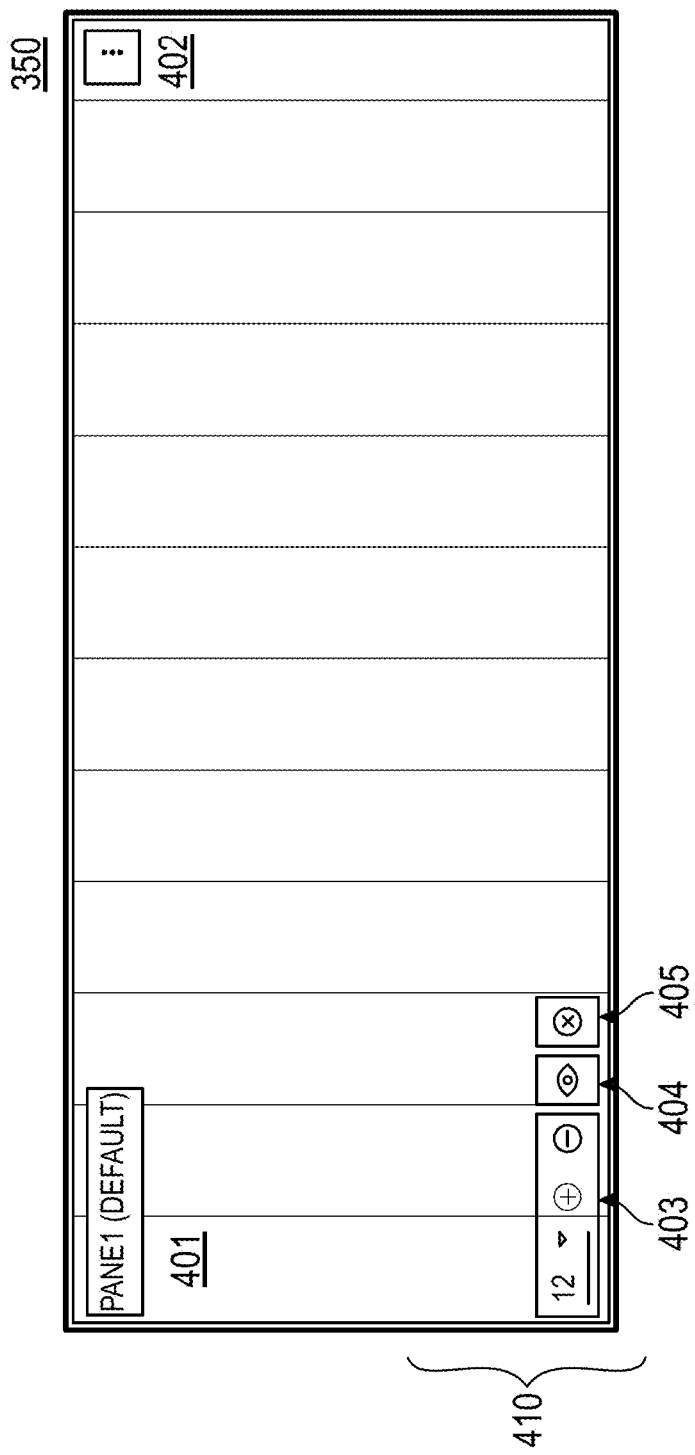
FIG. 4 illustrates a responsive layout pane design time according to some embodiments.

FIG. 4 illustrates a responsive layout pane design time for Pane 1 350 according to some embodiments. In some embodiments, the responsive layout pane design time is configured to include sections. In some embodiments, the sections include one or more of: Section 401: Pane Name, Section 402: Context Menu, Section 403: Column Span Controls, Section 404: Visibility, and/or Section 405: Delete Pane.

In some embodiments, section 401 is configured to show the pane name. In some embodiments, if the pane is the default pane, then "(default)" is appended to the name when not in edit mode. In some embodiments, the textbox is editable and is configured to allow a user to change pane name.

In some embodiments, the context menu 402 is configured to have the following items when no content is on the pane: "Rename Pane" which sets focus to Section 401, and "Delete Pane" which deletes the selected pane. In some embodiments, when a pane has content, the following items are configured to be added: "Edit <Content Name>", "Remove Content" and "Pane Properties/Content Properties".

In some embodiments, section 403 contains controls to change the column span (ColSpan) of a selected pane. In some embodiments, a dropdown is configured to list the numbers 1 through 12. In some embodiments, a user selects the number. In some embodiments, the ColSpan property is configured to update for the selected pane for the breakpoint that the responsive grid is currently in. In some embodiments, the + and − buttons are configured to increment and decrement the ColSpan property for the selected pane at the current breakpoint of the responsive grid.

In some embodiments, section 404 contains a button that is configured to hide or show a selected pane at the current breakpoint of the responsive grid. In some embodiments, the property which it is configured to be bound to is IsVisible. In some embodiments, section 405 contains a button that is configured to delete a selected pane from the layout. In some embodiments, if there is only one pane in the layout, it cannot be deleted.

In some embodiments, sections 401, 402, 403, 404, and 405 are collectively referred to as pane controls 410.

Some embodiments include responsive layout pane properties. In some embodiments, responsive layout pane properties are configured to include one or more of: Column Span, Push, Pull, Offset, and/or IsVisible.

In some embodiments, the column span property is used to determine the number of columns that a pane is configured to occupy in the grid. In some embodiments, the column span property propagates from XS to XL, unless the property is set for one of those breakpoints. For example: a pane has the following column span property values: ColXS (Column XS)=12, ColSM=0, ColMD=6, ColLG=0, ColXL=3 (i.e., in this case ColSM is configured to be 12 as it gets its value from ColXS). In some embodiments, ColLG is configured to be 6 as it gets its value from ColMD. In some embodiments, the default value is configured to be 0, except for ColXS which is configured to be 12.

In some embodiments, the push property is configured to push panes to the right by the number of columns that are set. In some embodiments, when panes are pushed into other panes, they are configured to be hidden behind the pane to their right. In some embodiments, panes are configured to be partially or fully hidden. In some embodiments, panes are configured to be pushed partially or completely off the display. In some embodiments, the push property is configured to propagate the same way that the Column span property does. In some embodiments, the default value is configured to be 0.

In some embodiments, the pull property is configured to pull panes to the left by the number of columns that is set. In some embodiments, when panes are pulled into other panes, they are configured to overlap the pane to their left. In some embodiments, panes are configured to partially or fully overlap panes next to them. In some embodiments, panes are configured to be pushed partially or completely off the display. In some embodiments, the pull property is configured to propagate the same way that the Column span property does. In some embodiments, the default value is configured to be 0.

In some embodiments, the offset property is configured to push the pane to the right. In some embodiments, the offset property is configured to push the selected pane and all panes after it to the right by that many columns. In some embodiments, the offset property is not configured to cause panes to overlap by itself. In some embodiments, the offset property is configured to propagate the same way that the Column span property does. In some embodiments, the default value is configured to be 0.

In some embodiments, the IsVisible property is configured to determine whether a pane is shown or hidden at a certain breakpoint. In some embodiments, when the value of the IsVisible property is true, the pane is configured to be shown. In some embodiments, when the value of the IsVisible property is false, the pane is configured to be hidden. In some embodiments, the IsVisible property does not propagate. In some embodiments, when the IsVisible property does not propagate, the default value is configured to be true.

Some embodiments include web client runtime behaviors. Some embodiments include Using Responsive Layout in Web Client and Web Client Runtime. In some embodiments, when using responsive layouts in the Web Client, current responsive layouts are configured to be used with OMI View Applications. In some embodiments, to see a responsive layout in the Web Client, a user must configure an OMI View Application with a responsive layout. In some embodiments, a user experience for using a responsive layout in an OMI View Application can be the same as using a fixed layout.

Some embodiments include a web client runtime. In some embodiments, the InTouch Web Client runtime is configured to support responsive layouts. In some embodiment, the layouts it renders are configured to be HTML based and use libraries for their responsiveness. In some embodiments, as the browser is resized, the layout is configured to respond based on the configuration.

Some embodiments include OMI runtime behaviors. In some embodiments, to use a responsive layout in the OMI runtime, the user selects the layout in the View Application Editor. In some embodiments, OMI View Applications are configured to support both fixed and responsive layouts.

Some embodiments include OMI view application runtime. In some embodiments, the OMI View Application runtime uses the Responsive Grid WPF control to render the layout. In some embodiments, this is the same control that is used at design time for the responsive layout editor. In some embodiments, the behavior in runtime and design time are configured to match exactly.

Figure 5:
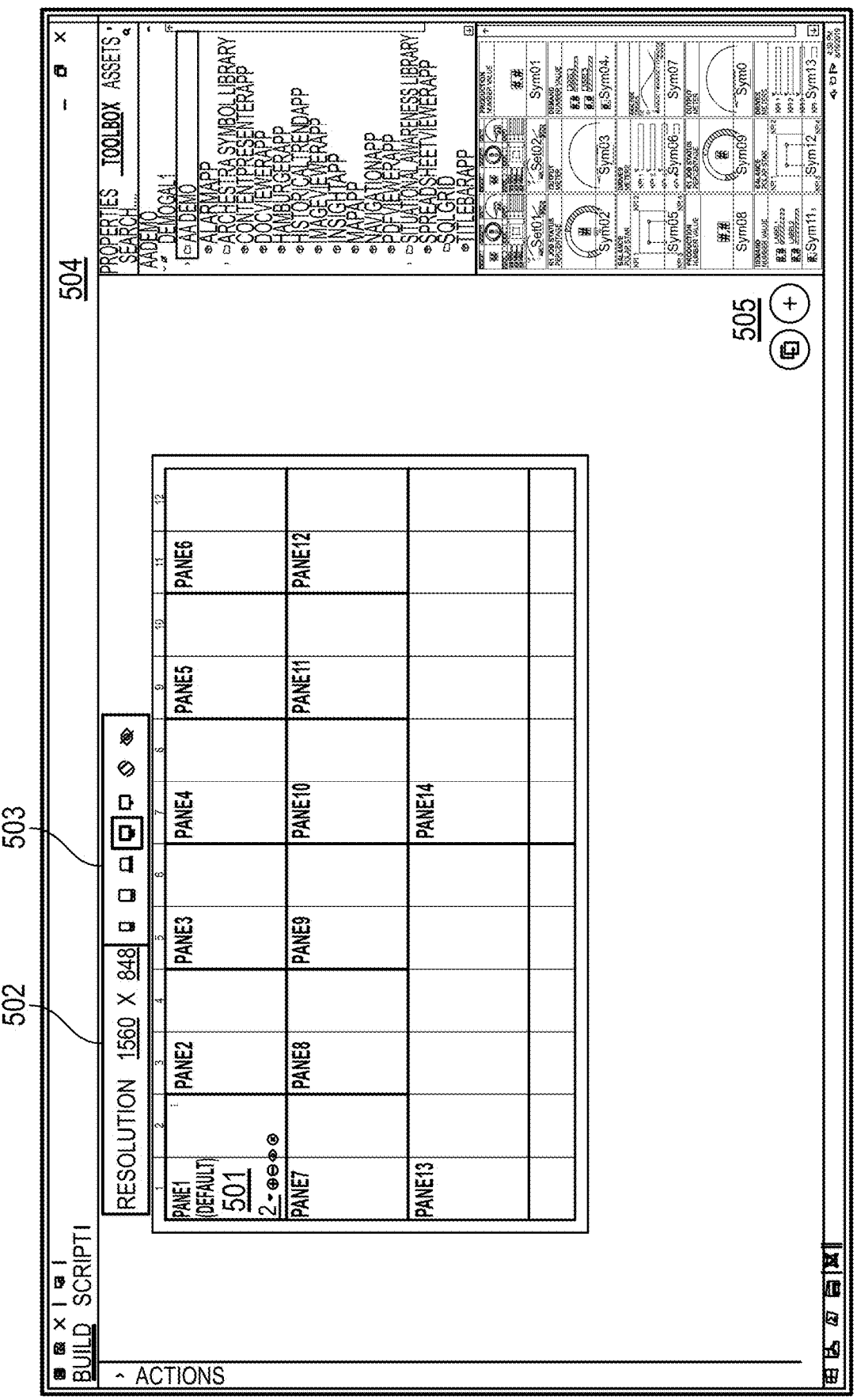
FIG. 5 illustrates a responsive layout editor according to some embodiments.
Figure 6:
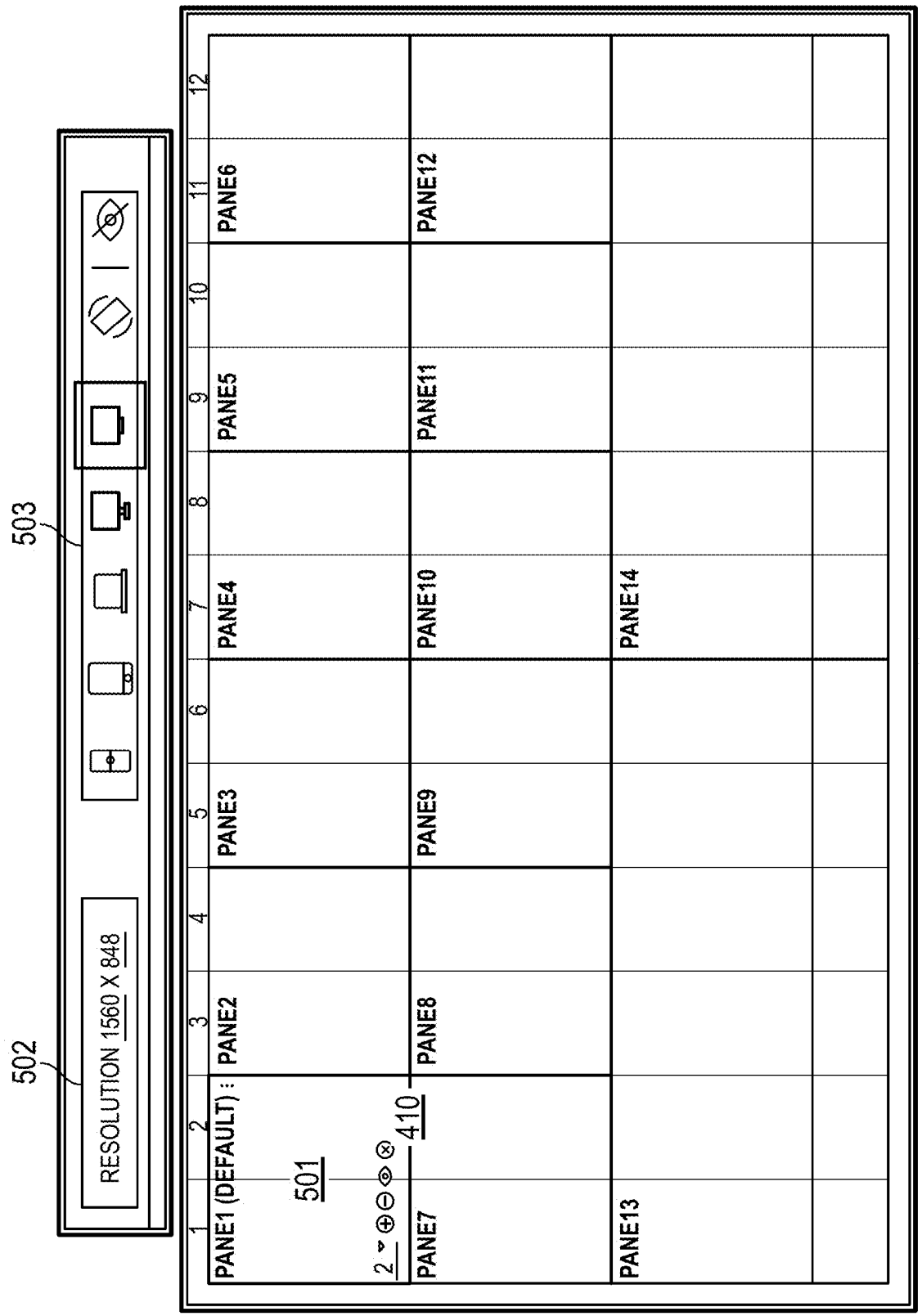
FIG. 6 is a zoomed in perspective of features of the responsive layout editor of FIG. 5 according to some embodiments.
Figure 7:
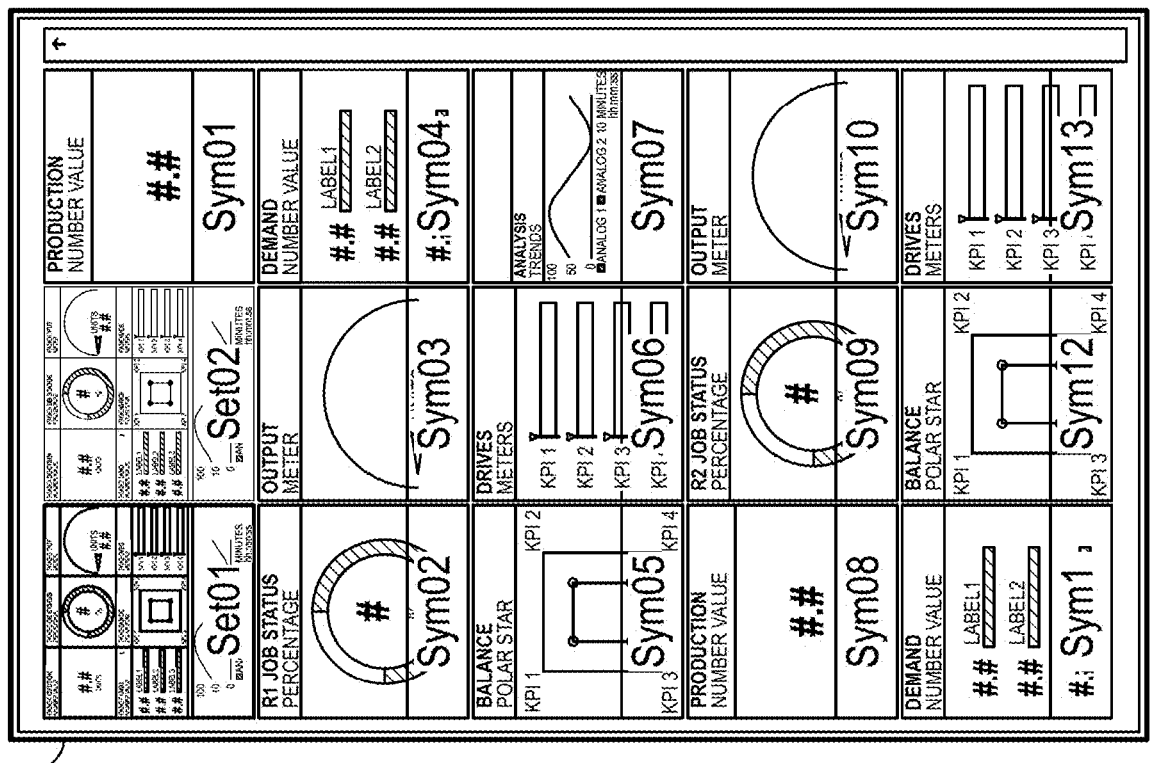
FIG. 7 is a zoomed in perspective of features of the responsive layout editor of FIG. 5 according to some embodiments.
Figure 7:
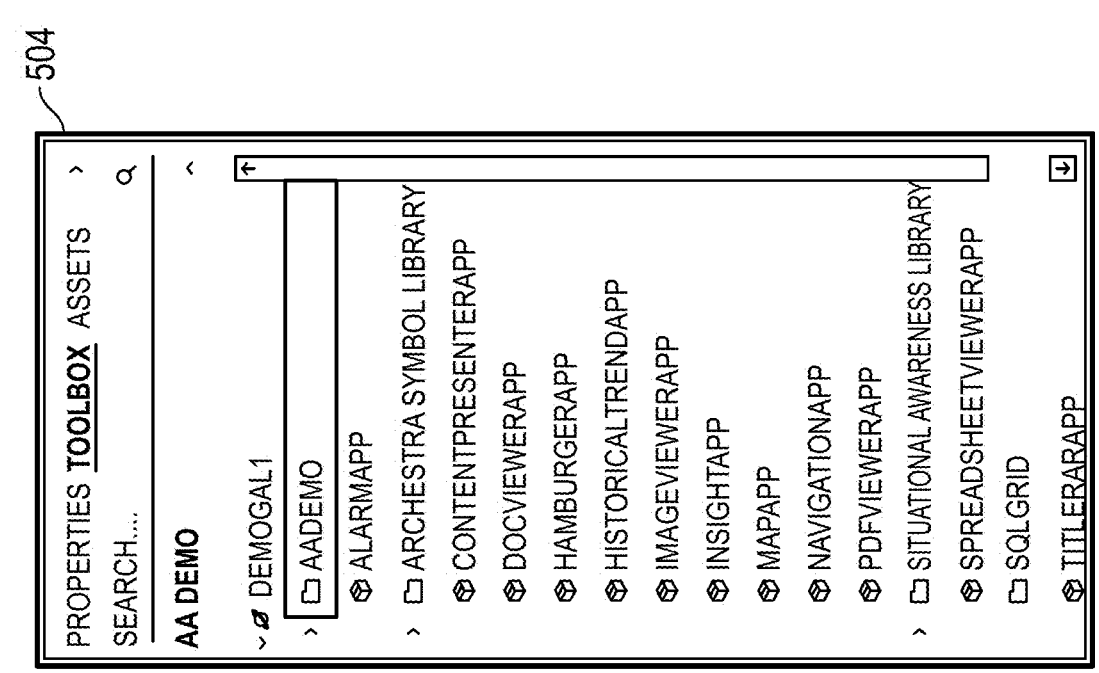

FIG. 5 illustrates a responsive layout editor according to some embodiments. In some embodiments, the responsive grid is set to a particular resolution 502 (best shown in FIG. 6) and a particular pane configuration 501 as selected in the responsive breakpoint menu 503. In some embodiments, pane configuration 501 is configured to be for a large monitor, a smart TV, or the like. In some embodiments, pane configuration 501 is configured to be a view selected in a virtual environment, a smart phone, or any display device that supports displaying images within the pane configuration 501. In some embodiments, responsive layout editor comprises a toolbox 504 and pane selection window 505 (best shown in FIG. 7)

Figure 8:
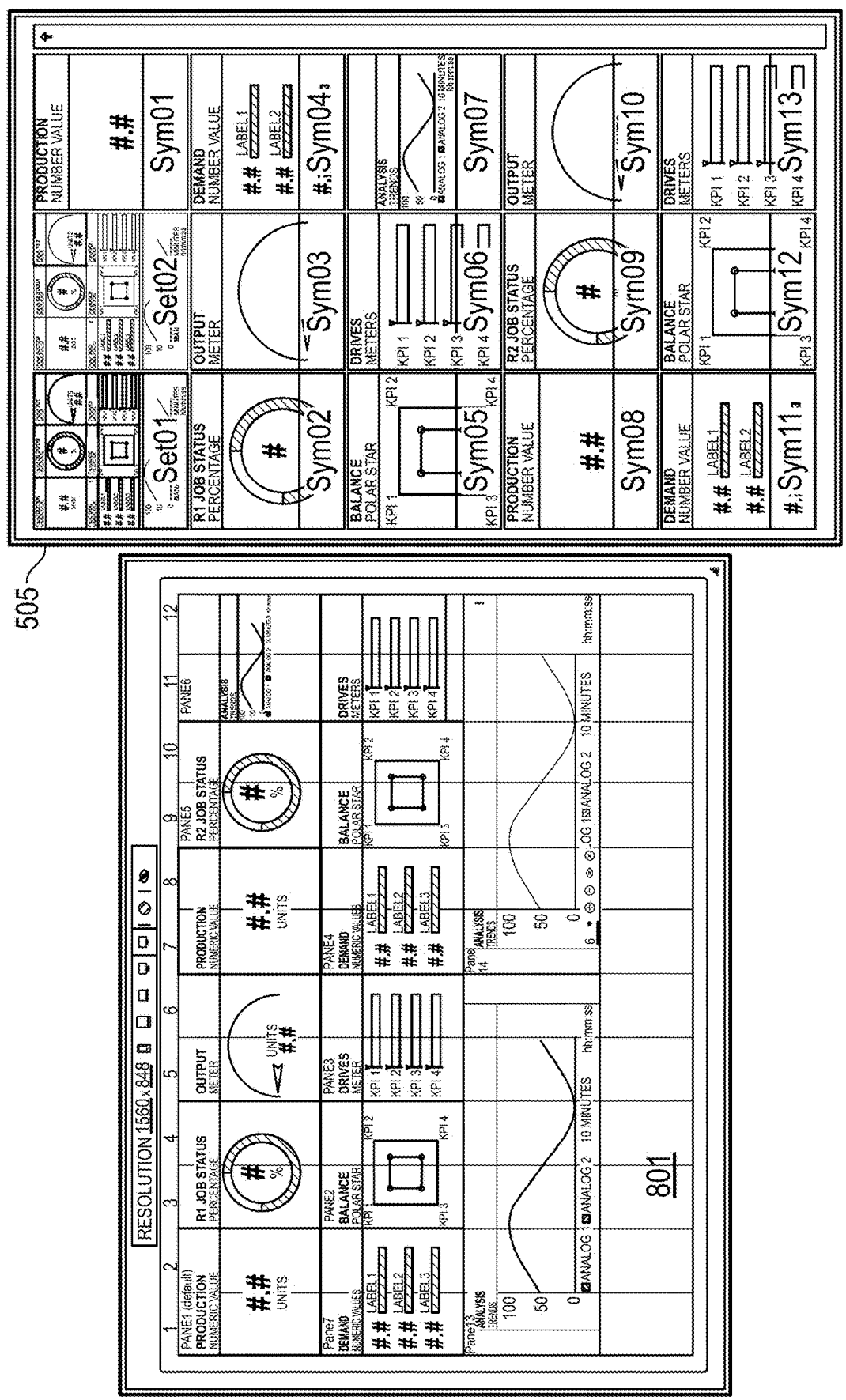
FIG. 8 illustrates the Add Pane of FIG. 5 populated with charts from the Toolbox of FIG. 5 according to some embodiments.

FIG. 8 illustrates the pane configuration 501 of FIG. 5 populated with charts from the pane selection window 505 according to some embodiments. According to some embodiments, pane configuration 501 is created by dragging panes from the pane selection window 505 into each pane.

Figure 9:
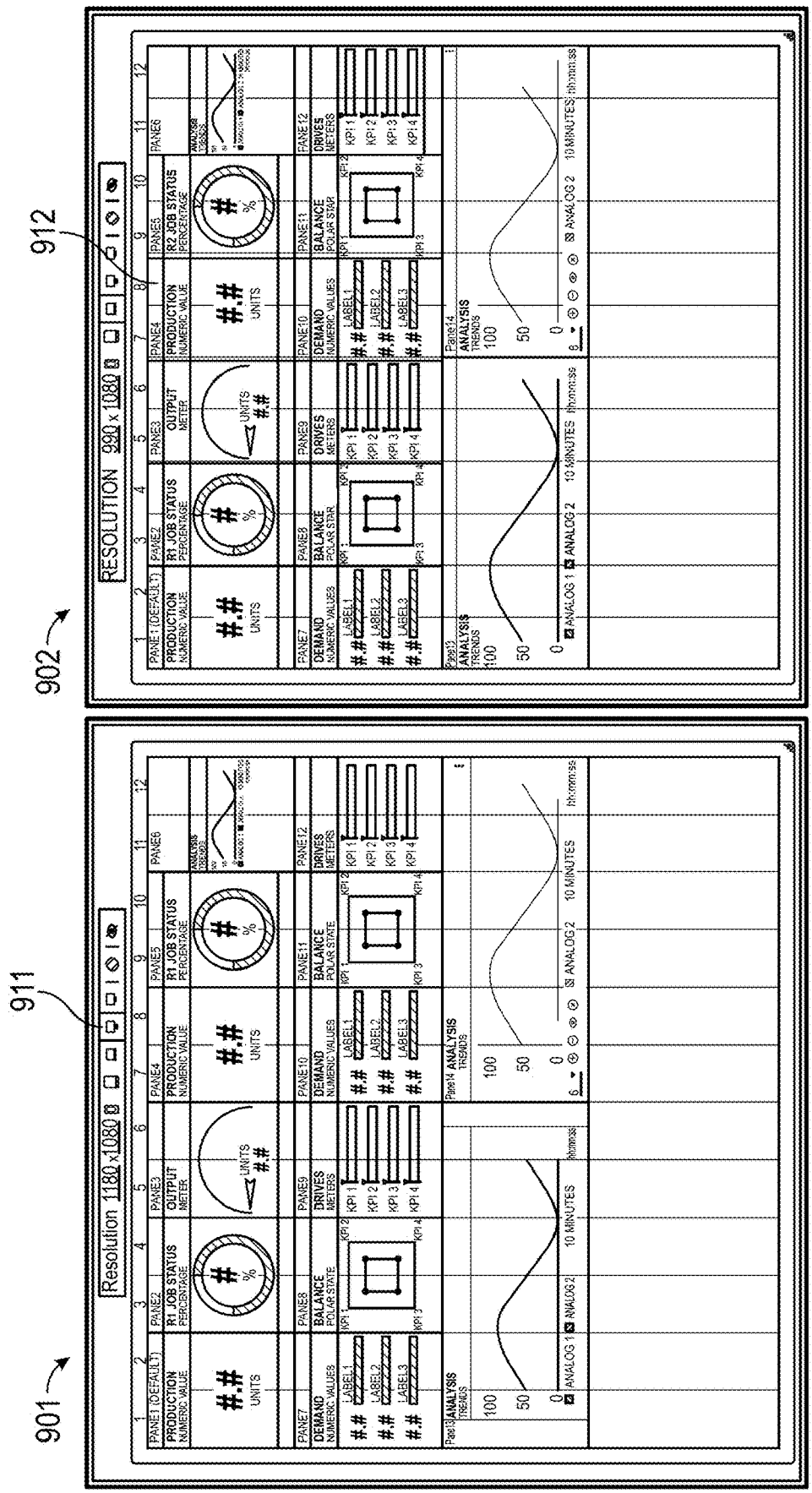
FIG. 9 depicts the Add Pane of FIG. 5 changed for display on a screen with a different resolution according to some embodiments.

FIG. 9 depicts the pane configuration 501 of FIG. 5 changed to be displayed on screens of different resolutions according to some embodiments. In some embodiments, the selection of screen resolution 911 causes a responsive layout change to a new pane configuration 901. In some embodiments, the selection of screen resolution 912 causes a responsive layout change to a new pane configuration 902. In some embodiments, pane configuration 902 is configured to be for a large monitor, a smart TV, a desktop monitor and/or the like. In some embodiments, pane configuration 501 is configured to be a view selected in a virtual environment, a smart phone, or any display device that supports displaying images within the pane configurations 901, 902.

Figure 10:
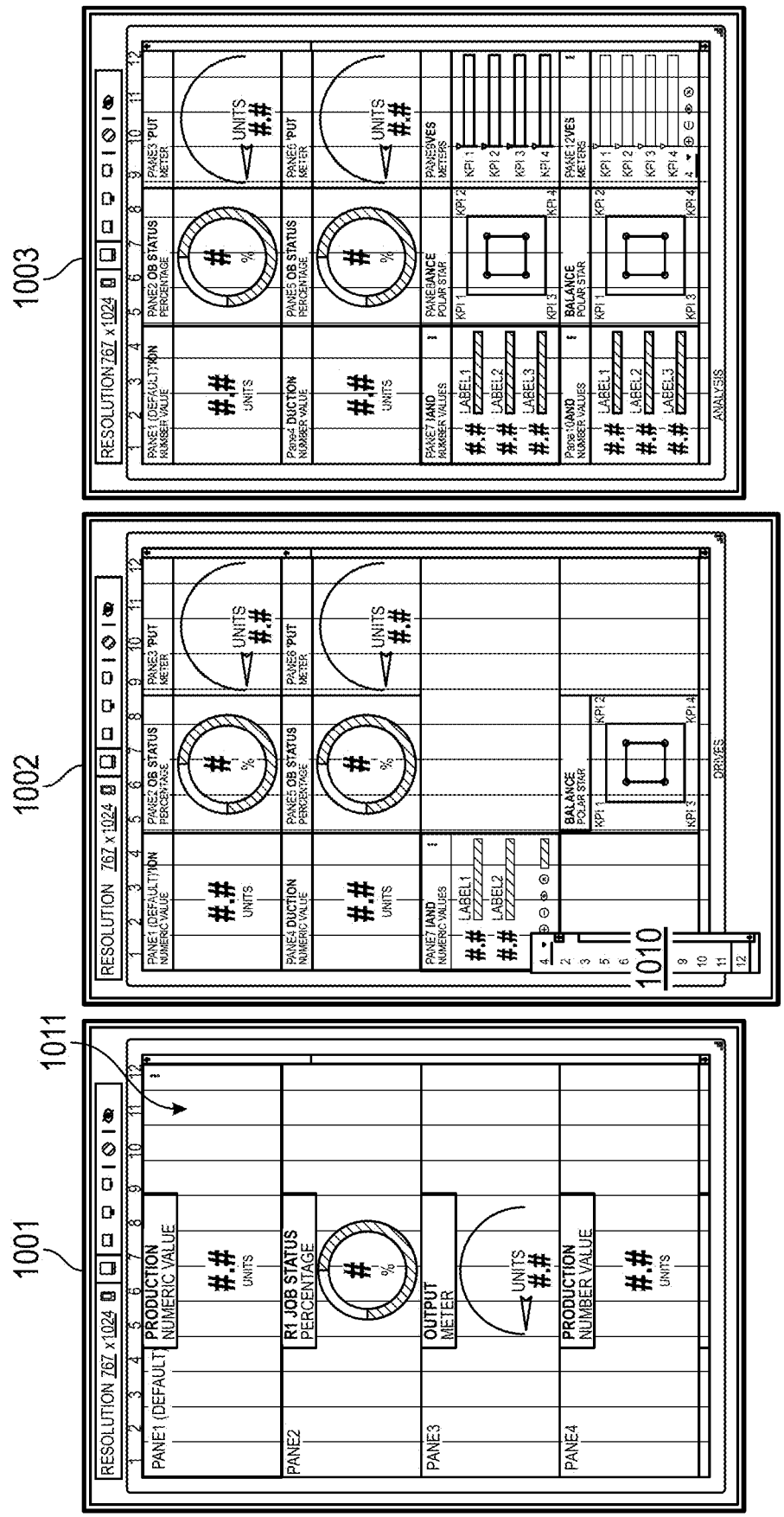
FIG. 10 shows changing the layout of the Add Pane to conform to a screen resolution according to some embodiments.

FIG. 10 shows changing the layout of the pane configuration 501 to conform to a screen resolution according to some embodiments. In some embodiments, the selection of screen resolution 1011 causes a responsive layout change to a new 4 pane configuration 1001. In some embodiments, pane configuration 1002 shows that the number of visible panes is altered by selecting the column span controls 1010. In some embodiments, the number of panes goes from a 4-pane configuration 1001 to a 12-pane configuration 1003. In some embodiments, the pane configuration is modified to show any number of panes.

Figure 11:
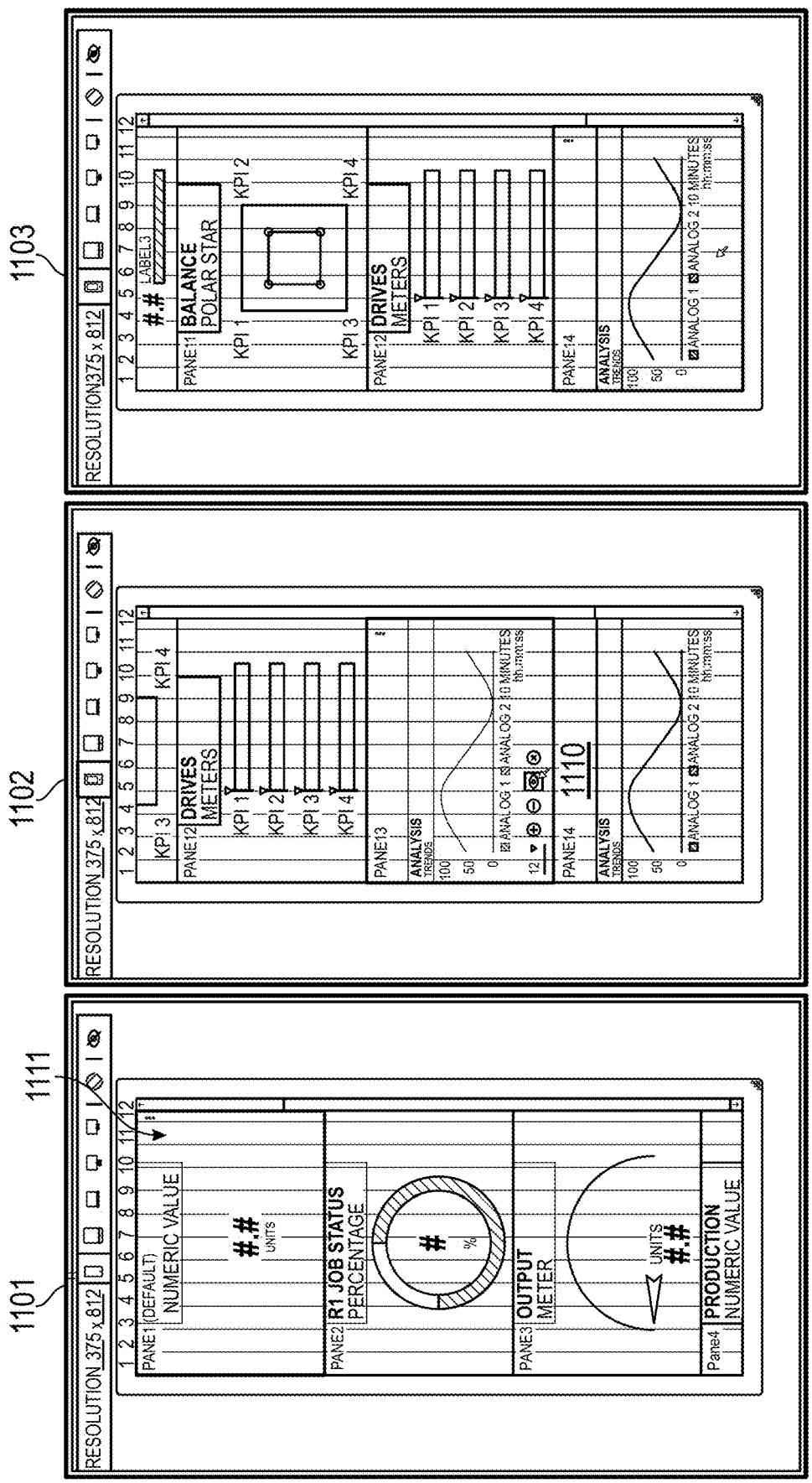
FIG. 11 shows hiding panes according to some embodiments.

FIG. 11 shows hiding panes in a screen resolution according to some embodiments. In some embodiments, pane configuration 1101 is obtained by selecting screen resolution 1111. In some embodiments, pane configuration 1101 is configured to be for a large monitor, a smart TV, a desktop monitor and/or the like. In some embodiments, pane configuration 501 is configured to be a view selected in a virtual environment, a smart phone, or any display device that supports displaying images within the pane configuration 1101. In some embodiments, hiding panes comprises moving a pane to within the view of the display device. In some embodiments, moving a pane comprises scrolling the screen of the display device. In some embodiments, selecting the visibility button 1110 hides the pane as shown in step 1102. In some embodiments, hiding a pane, such as pane 13, results in the pane configuration 1103 where pane 13 is not shown.

Figure 12:
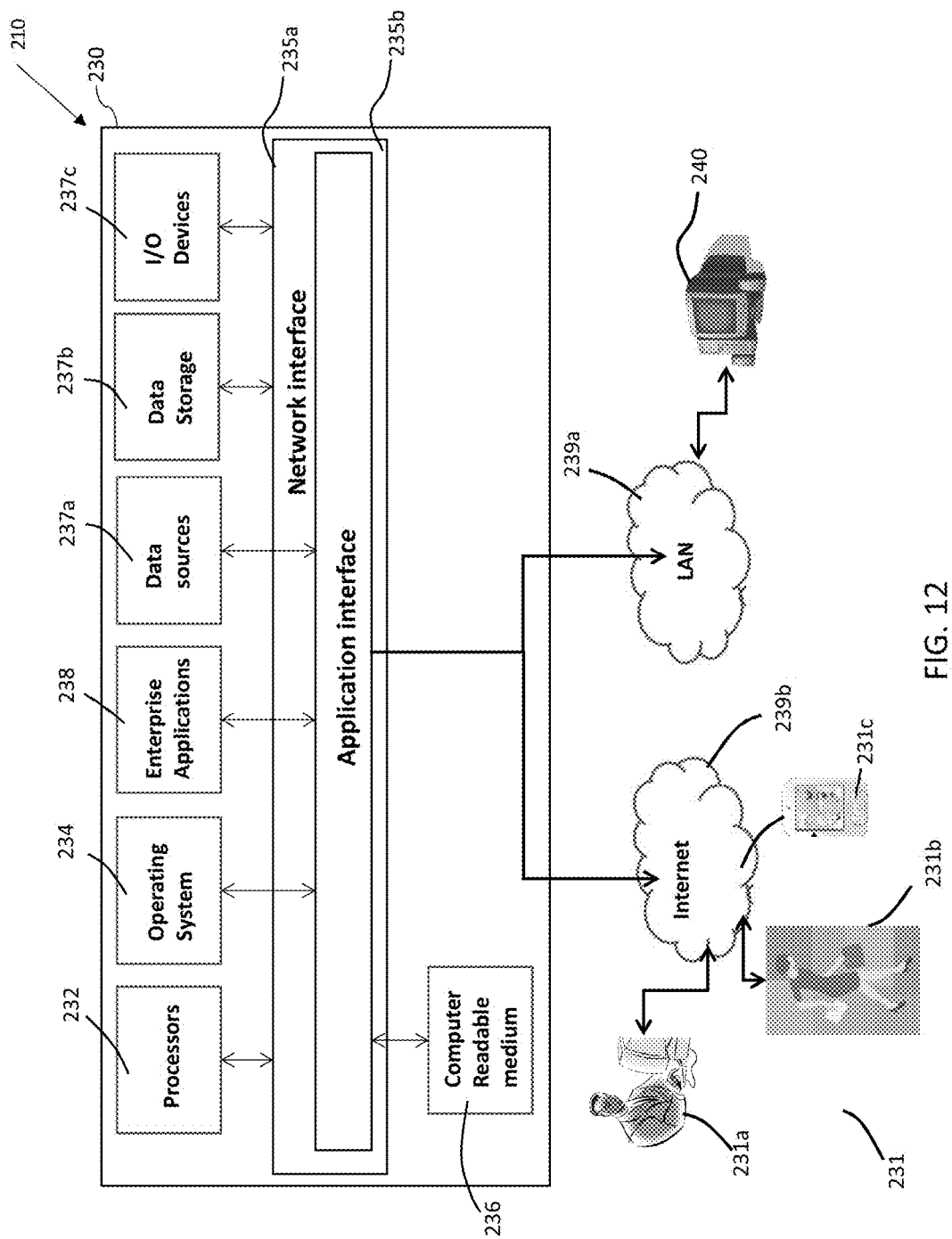
FIG. 12 illustrates an exemplary computer system enabling or aspects of the system described herein.

FIG. 12 illustrates a computer system enabling or operating the responsive layout system and server according to some embodiments. In some embodiments, the responsive layout system and server are configured to be operatively coupled to the computer system 210 shown in FIG. 2. In some embodiments, the computer system 210 is configured to comprise the responsive layout system and server. In some embodiments, the computer system 210 is configured to include and/or operate and/or process computer-executable code of one or more of the above-mentioned program logic, software modules, and/or systems. Further, in some embodiments, the computer system 210 is configured to operate and/or display information within one or more graphical user interfaces coupled to the responsive layout system and server. In some embodiments, the computer system 210 comprises a cloud server and/or is configured to be coupled to one or more cloud-based server systems.

In some embodiments, the system 210 comprises at least one computer including at least one processor 232. In some embodiments, the at least one processor 232 includes a processor residing in, or coupled to, one or more server platforms. In some embodiments, the system 210 includes a network interface 235a and an application interface 235b coupled to the least one processor 232 capable of processing at least one operating system 234. Further, in some embodiments, the interfaces 235a, 235b coupled to at least one processor 232 is configured to process one or more of the software modules 238 (e.g., such as enterprise applications). In some embodiments, the software modules 238 include server-based software, and operate to host at least one user account and/or at least one client account, and operate to transfer data between one or more of these accounts using the at least one processor 232.

With the above embodiments in mind, it should be understood that the invention can employ various computer-implemented operations involving data stored in computer systems. Moreover, in some embodiments, the above-described databases and models described throughout can store analytical models and other data on computer-readable storage media within the system 210 and on computer-readable storage media coupled to the system 210. In addition, in some embodiments, the above-described applications of the system are configured to be stored on computer-readable storage media within the system 210 and/or on computer-readable storage media coupled to the system 210. In some embodiment, these operations are those requiring physical manipulation of physical quantities. Usually, though not necessarily, in some embodiments, these quantities take the form of electrical, electromagnetic, or magnetic signals, optical or magneto-optical form capable of being stored, transferred, combined, compared and otherwise manipulated. In some embodiments, the system 210 comprises at least one computer readable medium 236 coupled to at least one data source 237a, and/or at least one data storage device 237b, and/or at least one input/output device 237c.

In some embodiments, the invention is embodied as computer readable code on a computer readable medium 236. In some embodiments, the computer readable medium 236 is any data storage device that can store data, which can thereafter be read by a computer system (such as the system 210). In some embodiments, the computer readable medium 236 is any physical or material medium that can be used to tangibly store the desired information or data or instructions and which can be accessed by a computer or processor 232.

In some embodiments, the computer readable medium 236 includes hard drives, network attached storage (NAS), read-only memory, random-access memory, FLASH based memory, CD-ROMs, CD-Rs, CD-RWs, DVDs, magnetic tapes, other optical and non-optical data storage devices. In some embodiments, various other forms of computer-readable media 236 transmit or carry instructions to a computer 240 and/or at least one user 231, including a router, private or public network, or other transmission device or channel, both wired and wireless. In some embodiments, the software modules 238 is configured to send and receive data from a database (e.g., from a computer readable medium 236 including data sources 237*a* and data storage 237*b* that comprises a database), and data is received by the software modules 238 from at least one other source. In some embodiments, at least one of the software modules 238 is configured within the system to output data to at least one user 231 via at least one graphical user interface rendered on at least one digital display.

In some embodiments, the computer readable medium 236 is distributed over a conventional computer network via the network interface 235*a* where the system embodied by the computer readable code can be stored and executed in a distributed fashion. For example, in some embodiments, one or more components of the system 210 is configured to send and/or receive data through a local area network ("LAN") 239*a* and/or an internet coupled network 239*b* (e.g., such as a wireless internet). In some further embodiments, the networks 239*a*, 239*b* are configured to include wide area networks ("WAN"), direct connections (e.g., through a universal serial bus port), and/or other forms of computer-readable media 236, and/or any combination thereof.

In some embodiments, components of the networks 239*a*, 239*b* include any number of user devices such as personal computers including for example desktop computers, and/or laptop computers, and/or any fixed, generally non-mobile internet appliances coupled through the LAN 239*a*. For example, some embodiments include personal computers 240*a* coupled through the LAN 239*a* that can be configured for any type of user including an administrator. Some embodiments include personal computers coupled through network 239*b*. In some further embodiments, one or more components of the system 210 are coupled to send or receive data through an internet network (e.g., such as network 239*b*).

For example, some embodiments include at least one user 231 coupled wirelessly and accessing one or more software modules of the system including at least one enterprise application 238 via an input and output ("I/O") device 237*c*. In some other embodiments, the system 210 can enable at least one user 231 to be coupled to access enterprise applications 238 via an I/O device 237*c* through LAN 239*a*. In some embodiments, the user 231 can comprise a user 231*a* coupled to the system 210 using a desktop computer, laptop computers, and/or any fixed, generally non-mobile internet appliances coupled through the internet 239*b*. In some further embodiments, the user 231 comprises a mobile user 231*b* coupled to the system 210. In some embodiments, the user 231*b* can use any mobile computer 231*c* to wireless coupled to the system 210, including, but not limited to, personal digital assistants, and/or cellular phones, mobile phones, or smart phones, and/or pagers, and/or digital tablets, and/or fixed or mobile internet appliances.

Acting as Applicant's own lexicographer, Applicant defines the use of and/or, in terms of "A and/or B," to mean one option could be "A and B" and another option could be "A or B." Such an interpretation is consistent with the USPTO Patent Trial and Appeals Board ruling in ex parte Gross, where the Board established that "and/or" means element A alone, element B alone, or elements A and B together.

Some embodiments of the system are presented with specific values and/or setpoints. These values and setpoints are not intended to be limiting, and are merely examples of a higher configuration versus a lower configuration and are intended as an aid for those of ordinary skill to make and use the system. In addition, "substantially" and "approximately" when used in conjunction with a value encompass a difference of 10% or less of the same unit and scale of that being measured. In some embodiments, "substantially" and "approximately" are defined as presented in the specification.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Modifications to the illustrated embodiments and the generic principles herein can be applied to all embodiments and applications without departing from embodiments of the system. Also, it is understood that features from some embodiments presented herein are combinable with other features according to some embodiments. Thus, some embodiments of the system are not intended to be limited to what is illustrated but are to be accorded the widest scope consistent with all principles and features disclosed herein.

The invention claimed is:

1. A responsive layout editor system comprising:
one or more computers comprising one or more processors and one or more non-transitory computer readable media, the one or more non-transitory computer readable media comprising instructions stored thereon that when executed cause the one or more computers to:
receive, by the one or more processors, one or more inputs to modify a responsive layout within a responsive layout editor via a graphical user interface (GUI);
divide, by the one or more processors, the responsive layout into one or more columns based on the one or more inputs;
enable, by the one or more processors, a user to modify properties of one or more panes in the responsive layout through the responsive layout editor, the properties including at least one or more of a size, a location, an orientation, and a content of the one or more panes in the responsive layout through the responsive layout editor;
determine, by the one or more processors, a number of columns that each of the one or more panes are configured to occupy within the responsive layout for a first screen resolution; and
execute, by the one or more processors, a change to the responsive layout to conform to a second screen resolution, wherein the change includes the configuration of the one or more panes being automatically adjusted in the responsive layout based on the second screen resolution and the determined number of columns each of the one or more panes occupy, the one or more pane properties being maintained after the change.

2. The responsive layout editor system of claim 1, the one or more non-transitory computer readable media comprising instructions stored thereon that when executed further cause the one or more computers to:
rearrange, by the one or more processors, the number of columns displayed depending on the device resolution.

3. The responsive layout editor system of claim 1, wherein the responsive layout is configured to rearrange the number of columns depending on the device resolution.

4. The responsive layout editor system of claim 1, wherein the user can configure how much of an available display an individual pane can occupy on different device form factors.

5. The responsive layout editor system of claim 1, the one or more non-transitory computer readable media comprising instructions stored thereon that when executed further cause the one or more computers to:
enable, by the one or more processors, the user to configure the responsive layout to respond and change based on a device display on which the user is viewing the responsive layout.

6. The responsive layout editor system of claim 1, wherein the responsive layout is configured to automatically arrange panes and size panes to fit different device displays.

7. The responsive layout editor system of claim 1, wherein the responsive layout is configured to zoom out on a particular pane while other panes are expanded into a display while maintaining a same pane layout.

8. The responsive layout editor system of claim 1, the one or more non-transitory computer readable media comprising instructions stored thereon that when executed further cause the one or more computers to:
determine, by the one or more pane properties, whether a pane of the one or more panes is shown or hidden at a breakpoint.

9. The responsive layout editor system of claim 8, wherein one or more breakpoint attributes include a feature that defines a size of a pane content and/or a dimension of the one or more panes.

10. The responsive layout editor system of claim 9, wherein the pane content is configured to be resized, moved, or hidden in the responsive layout based on device form factors.

11. The responsive layout editor system of claim 10, wherein the responsive layout is configured to allow users to arrange their content based on a device display.

12. The responsive layout editor system of claim 9, wherein the one or more breakpoint attributes further include a size of one or more items in a pane and overflow behavior.

13. The responsive layout editor system of claim 8, wherein the responsive layout is configured to push one or more of the one or more panes into a different column based on the breakpoint.

14. The responsive layout editor system of claim 1, wherein the responsive layout editor is configured to enable the user to select an aspect ratio; wherein the responsive layout editor is configured to enable the user to maintain the aspect ratio after the change.

15. The responsive layout editor system of claim 1, wherein the responsive layout editor is configured to enable the user to configure how much of an available display an individual pane can occupy on different device displays.

16. The responsive layout editor system of claim 15, wherein the responsive layout is configured to automatically arrange panes to fit different device displays.

17. The responsive layout editor system of claim 16, wherein the responsive layout is configured to automatically size the one or more panes to fit different device displays.

18. The responsive layout editor system of claim 16, wherein the responsive layout is configured to zoom in on a particular pane while other panes are expanded out of a display while maintaining a same pane layout.

* * * * *